(12) United States Patent
Golley

(10) Patent No.: US 7,105,139 B2
(45) Date of Patent: Sep. 12, 2006

(54) STABILIZATION OF THE VISCOSITY OF FORMAMIDINE SULFINIC ACID BLEACHED CALCIUM CARBONATE SLURRIES

(75) Inventor: Christopher R. L. Golley, Sandersville, GA (US)

(73) Assignee: Imerys Pigments, Inc., Roswell, GA (US)

( * ) Notice: Subject to any disclaimer, the term of this patent is extended or adjusted under 35 U.S.C. 154(b) by 281 days.

(21) Appl. No.: 10/254,553

(22) Filed: Sep. 26, 2002

(65) Prior Publication Data

US 2003/0202929 A1 Oct. 30, 2003

Related U.S. Application Data

(60) Provisional application No. 60/375,049, filed on Apr. 25, 2002.

(51) Int. Cl.
*C01F 11/18* (2006.01)

(52) U.S. Cl. ..................... 423/275; 423/430
(58) Field of Classification Search ........... 423/430, 423/431, 432, 275
See application file for complete search history.

(56) References Cited

U.S. PATENT DOCUMENTS

| | | | |
|---|---|---|---|
| 2,520,850 A | | 8/1950 | Minnick |
| 3,245,819 A | | 4/1966 | Eberts |
| 4,239,736 A | * | 12/1980 | Fenske ................. 423/173 |
| 4,793,985 A | | 12/1988 | Price et al. |
| 4,824,653 A | | 4/1989 | Severinghaus et al. |
| 4,900,533 A | | 2/1990 | Malden |
| 5,188,814 A | * | 2/1993 | Hellstrom et al. ........... 423/430 |
| 5,317,053 A | | 5/1994 | Brown et al. |
| 5,593,489 A | | 1/1997 | Wu |
| 5,846,382 A | | 12/1998 | von Raven |
| 5,879,442 A | | 3/1999 | Nishiguchi et al. |
| 5,913,973 A | | 6/1999 | Rodriguez et al. |
| 6,132,696 A | * | 10/2000 | Porter et al. ............... 423/414 |
| 6,143,065 A | | 11/2000 | Freeman et al. |
| 6,302,999 B1 | | 10/2001 | Engelhardt et al. |

FOREIGN PATENT DOCUMENTS

| | | |
|---|---|---|
| DE | 198 20 122 | 11/1999 |
| EP | 0 850 880 | 7/1998 |
| GB | 2103197 | 2/1983 |
| JP | 58 151326 | 9/1983 |
| JP | 59-69426 | 4/1984 |
| JP | 06 041892 | 2/1994 |
| SU | 937490 | 6/1982 |
| WO | WO 99/24361 | 5/1999 |
| WO | WO 00/51941 | 9/2000 |

OTHER PUBLICATIONS

Shioji Naotake et al, "Preparation of Aqueous Calcium Carbonate Dispersions with Low Viscosity and Improved Storage Stability," Chemical Abstracts + Indexes, *American Chemical Society*, vol. 110 no. 20, May 15, 1989, p. 168.

* cited by examiner

*Primary Examiner*—Wayne A. Langel
(74) *Attorney, Agent, or Firm*—Finnegan, Henderson, Farabow, Garrett & Dunner, L.L.P.

(57) ABSTRACT

Bleaching a particulate calcium carbonate aqueous slurry with a reductive bleaching agent such as formamidine sulfinic acid increases the viscosity of the slurry. Combining the slurry with a metal material such as strontium hydroxide reduces any increase in viscosity of the bleached calcium carbonate slurry. Addition of the reductive bleaching agent and/or the metal material takes place prior to, during or after the manufacture of the slurry or the bleaching step. Metal materials in one embodiment include those that form substantially water insoluble precipitates of the reductive bleaching reaction products.

24 Claims, No Drawings

STABILIZATION OF THE VISCOSITY OF FORMAMIDINE SULFINIC ACID BLEACHED CALCIUM CARBONATE SLURRIES

RELATED APPLICATION

This application claims the benefit under 35 U.S.C. § 119(e) of U.S. Provisional Application No. 60/375,049, filed Apr. 25, 2002, entitled "Stabilization of the Viscosity of Formamidine Sulfinic Acid Bleached Calcium Carbonate Slurries," which is hereby incorporated by reference in its entirety.

FIELD OF THE INVENTION

The invention relates to the stabilization of the viscosity of calcium carbonate slurries bleached with a reductive bleaching agent such as formamidine sulfinic acid (FAS) or sodium hydrosulfite, and especially bleached ground calcium carbonate slurries, or bleached precipitated calcium carbonate slurries.

BACKGROUND OF THE INVENTION

Producers of paper, paper coatings, plastic compositions, and non aqueous surface coatings such as paints and film laminates use mineral materials such as calcium carbonate as property enhancing pigments or fillers in these products.

The appearance of paper, plastic compositions, and surface coatings, such as the whiteness and brightness of the product is significant, especially in the finer grades of printing and writing papers, plastics employed in consumer goods, and decorative surface coatings. The majority of these products require a calcium carbonate having the highest degree of whiteness and brightness.

Manufacturers of particulate calcium carbonates used in these applications supply calcium carbonate as a high solids slurry, e.g., a high solids ground calcium carbonate (GCC) slurry, which they bleach with FAS or sodium hydrosulfite, both FAS and sodium hydrosulfite, and the equivalents thereof, referred to hereafter as reductive bleaching agents. They have found, however, bleaching high solids GCC slurries with reductive bleaching agents raises the Brookfield viscosity, with the slurry thickening much faster than normal. The thickening of the slurry is severe enough to make it difficult, if not impossible to empty tank trucks or tank rail cars by gravity discharge when the bleached carbonate stands for more than about eight to about ten hours. This problem becomes more pronounced with more finely ground high solids GCC slurries bleached with reductive bleaching agents.

The present invention comprises the discovery that ions in solution resulting from the breakdown products of the reductive bleaching agents cause this thickening. These ions include ions of sulfur acids, sulfites, bisulfites, sulfates, and the like. Urea, another breakdown product of FAS bleaching, does not appear to cause this thickening since it does not ionize. These acidic anions also lower the pH of the high solids GCC slurries, which paper manufacturers try to avoid since this can adversely affect the properties (coating color) of the mixture of calcium carbonate and reductive bleaching agent used to coat paper.

It would therefore be an advantage to negate the effects of the sulfur acid ions such as sulfite, bisulfite, water soluble sulfate ions, and the like in the process, and make reductive bleaching a viable process for the treatment of high solids GCC slurries.

SUMMARY OF THE INVENTION

The present invention achieves these and other advantages, and comprises a process, composition, and product produced by the process, which substantially obviates one or more of the limitations and disadvantages described above. The written description which follows describes additional features and advantages of the invention, which will also become apparent or learned by practice of the invention.

To achieve these and other advantages, and in accordance with the purpose of the invention, as embodied and broadly described, the invention comprises a process for bleaching a particulate calcium carbonate aqueous slurry, a composition comprising a particulate calcium carbonate aqueous slurry, and a product made by the process of bleaching a particulate calcium carbonate aqueous slurry.

This process for bleaching a particulate calcium carbonate aqueous slurry comprises combining the particulate calcium carbonate aqueous slurry with (1) a reductive bleaching agent to provide reductive bleaching of the particulate calcium carbonate aqueous slurry and (2) a metal material selected to reduce any increase in viscosity of the bleached particulate calcium carbonate. In another embodiment, the metal material is selected to react with anions produced by the reductive bleaching and produce a metal material reaction product which is a substantially water insoluble metal material reaction product. The metal material may comprise any metal or oxide, peroxide or hydroxide thereof that will not substantially interfere with the whitening of the particulate calcium carbonate aqueous slurry produced by the reductive bleaching, and which has a viscosity lowering affect on the calcium carbonate bleached with the reductive bleaching agent, especially a metal material that forms a substantially water insoluble precipitate with the reaction products of the reductive bleaching agents.

The inventor has obtained the desired results where the metal material is strontium, strontium oxide, strontium peroxide, and strontium hydroxide. Although the process, composition, and product produced by the process of the invention can employ strontium metal, the instability of strontium metal, and its rapid rate of reaction, and high exotherm in aqueous media make it difficult to employ in industrial applications. For this reason, the invention, in one embodiment, employs strontium hydroxide as the metal material.

Any metal material whether the metal itself, metal oxide, metal peroxide or metal hydroxide can be used according to the invention, provided the reaction products of these metals with the various sulfur acids, sulfites, bisulfites, and sulfates produced as a by-product of the reductive bleaching, lower the viscosity of the calcium carbonate bleached with the reductive bleaching agents. This especially includes metal materials that form precipitates with the reaction products of the reductive bleaching agents that are substantially insoluble in water, defined as a solubility of up to about 0.019 g/100 ml in hot or cold water, or up to about 0.017 g/100 ml in cold or hot water, or up to about 0.015 g/100 ml in cold water or hot water. The CRC Handbook of Chemistry and Physics 74th Edition, Physical Constants of Inorganic Compounds, lists these metal materials, and defines these solubilities. As used herein the phrases "up to about 0.019 g/100 ml in hot or cold water, or up to about 0.017 g/100 ml in cold or hot water, or up to about 0.015 g/100 ml in cold water or hot water" include precipitates that substantially do not dissolve in cold or hot water as defined herein or are soluble from the lower limits of these ranges up to about the recited numerical limit of solubility in cold water or hot water. In addition, any substantial detraction from the whiteness of the calcium carbonate produced by the reductive bleaching agents controls the selection of metal materials equivalent to strontium materials, i.e., the invention does not include metal materials that fall into this category. The invention also employs combinations of metal materials, especially the two component combinations, or three component combinations.

The invention also comprises combining the metal material with the calcium carbonate prior to during or after formation of the slurry, or prior to, during or after reductive bleaching, and in one embodiment, combining the metal material with the aqueous slurry subsequent to the reductive bleaching, and after said bleached particulate calcium carbonate slurry has increased in viscosity. Where combining the metal material with the calcium carbonate prior to or during formation of the slurry, or prior to or during reductive bleaching, causes interference with, or prevents adequate bleaching of the calcium carbonate slurry, the metal material is added subsequent to reductive bleaching. In addition to combining the reductive bleaching agent with the calcium carbonate slurry during manufacture, as described herein, the reductive bleaching agent can be added during delivery of the reductively bleached calcium carbonate slurry, or during use of the reductively bleached calcium carbonate slurry, such as in paper making, plastic molding or extrusion, or surface coating manufacture, such as the manufacture of non-aqueous paints.

The metal material may be added to the calcium carbonate in this way in amounts of up to about two times the stoichiometric amount based on the reductive bleaching agent or from about 0.25% of this stoichiometric amount to about two times this stoichiometric amount, but the amount of metal material added can be varied by a person with skill in this art, based on the criteria dictated by the system of calcium carbonate and reductive bleaching agents to effect a desired reduction in viscosity, whether a slight reduction in viscosity up through a maximum reduction of viscosity during manufacture, delivery or use of the calcium carbonate slurry bleached with a reductive bleaching agent according to the invention.

The invention also relates to a composition of matter comprising a particulate calcium carbonate aqueous slurry combined with (1) a reductive bleaching agent to provide reductive bleaching of the particulate calcium carbonate aqueous slurry and (2) a metal material wherein the metal material is selected to reduce any increase in viscosity of the particulate calcium carbonate aqueous slurry combined with the reductive bleaching agent. Again, the metal material for the composition of matter is selected to react with anions resulting from the reductive bleaching, and produce a metal material reaction product. The metal material reaction product, in another embodiment, is substantially water insoluble. In a further embodiment, the metal material is a strontium material as described previously with regard to the process of the invention. Lastly, the invention relates to a product produced by the previously described process.

DETAILED DESCRIPTION

In order to address the deleterious effect of by-product sulfur acid, sulfite, bisulfite, and sulfate ions, and the like which result from bleaching of high solids calcium carbonate slurries with a reductive bleaching agent, a suitable cation had to be found which could remove or reduce the levels of these anions in solution. Ideally, the cation should not have a toxic effect, which ruled out barium, a regulated toxic heavy metal, used in the past to reduce the affects of sulfates in clays.

It was found that strontium hydroxide has the necessary properties since it not only reacts with the reductive bleaching agent by-products, but also the sulfate has a solubility of 0.01 g/100 ml of water compared with 0.24 g/100 ml of water for calcium sulfate. Strontium does not appear to have any toxic properties, and in fact strontium hydroxide finds use in hair removal creams. Animal bone tissue contains a small proportion of strontium, and apparently coral will not grow without the presence of strontium above a certain threshold level.

Any metal material which includes any metal or metal oxide, peroxide or hydroxide, equivalent to the strontium material in terms of solubility and toxicity that will lower the viscosity of calcium carbonate bleached with a reductive bleaching agent will suffice for the purpose of the present invention, especially if the metal material forms an insoluble precipitate with the products of the reductive bleaching agent, and does not detract from the whiteness of the bleached calcium carbonate.

The calcium carbonate treated according to one embodiment of the present invention comprises GCC at a solids content of from about 60% by weight to about 80% by weight solids, or from about 65% by weight to about 78% by weight solids, or from about 74% by weight to about 76% by weight solids.

In addition to GCC materials, the process, composition, and product produced by the process of the present invention also apply to precipitated calcium carbonates (PCC), prepared by methods well known in the art which comprise carbonating an aqueous solution of slaked lime (calcium hydroxide) with carbon dioxide or a carbon dioxide containing gas to produce the precipitated calcium carbonate. In the PCC bleaching process of the present invention, the metal material may be added before, during or after the PCC manufacturing process, provided it does not interfere with calcium carbonate manufacture, or adversely affect the bleaching. Alternatively, the metal material may be added to the PCC calcium carbonate either before, during or after grinding, one embodiment of the present invention comprising conducting the reductive bleaching step after PCC grinding.

The PCC slurries produced according to the present invention also contain calcium carbonate solids in the same amount as previously noted with regard to the GCC product described herein.

Although viscosity increases occur in coarse, medium, and fine particulate calcium carbonate slurries, the finer particle size calcium carbonates tend to increase in viscosity at a faster rate and to a higher degree than coarse or medium particle size calcium carbonates. The calcium carbonates in this regard have a mean particle size d50, as measured by a Sedigraph™ 5100 machine (supplied by Micrometrics Corporation), of from about 5 microns to about 0.1 microns with respect to both GCC and PCC. The Sedigraph™ 5100 machine provides measurements, and a plot of the cumulative percentage by weight of particles having a size, referred to in the art as the "equivalent spherical diameter" (esd), less than the given esd values. The mean particle size, d50, is the value determined in this way, of the particle esd at which there are 50% by weight of the particles which have an esd less than that d50 value. Particle size distribution (psd) of the calcium carbonates of the present invention are measured as weight percent of about <2 micron of about 35% as the coarsest, to about 100% about <2 microns, and about 90% about <1 micron at a d50 of about 3.0 to about 0.3 microns.

The particle size distribution curves, which follow a bell curve distribution, show a very steep curve (representing a narrow distribution), and a very gradual curve (showing a broad distribution). The particle size distribution of the particulate calcium carbonates of the present invention typically follows these types of bell curves. The steepness of the psd of the particulate calcium carbonate according to the present invention, often referred to as narrowness of the psd, refers to the slope of the psd curve. Thus, in some cases the psd of the calcium carbonate according to the present invention may be steep and in other cases it may be broad. The steepness or broadness of the psd is one indicator of anticipated product performance, and can be selected by the skilled artisan based upon desired end properties. Steepness as used herein is measured as 100 times the ratio of d30 to d70, where d30 is the value of the particle esd less than which there are 30% particles, and d70 is the value of the particle esd less than which there are 70% of the particles as obtained from the psd measurement.

The calcium carbonate slurries of the present invention also contain, as a dispersing agent, a sodium polyacrylate having a molecular weight less than about 10,000. Any such sodium polyacrylate dispersant known to one of ordinary skill in the art may be used.

The dispersants employed in the examples of the invention comprise about 0.45 Wt. % of active material, although these dispersants may be employed in amounts anywhere from about 0.25 Wt. % to about 1.0 Wt. % of active material, based on the calcium carbonate slurry. The dispersant is applied as a solution in water having from about 40% by weight to about 50% by weight of solids, or active material.

EXAMPLES

Conducting FAS bleaching took into account that it has a molecular weight of 108, with strontium hydroxide having a molecular weight of 123.6. Each molecule of strontium hydroxide will react with one molecule of sulfur acid, sulfite, bisulfite or sulfate anion resulting from the bleaching process employing FAS. Accordingly, each unit weight of FAS is theoretically equivalent to 1.14 units of strontium hydroxide.

Table 1 shows the test results of a relatively low pH series dispersed first sample of GCC bleached with FAS, and identified as Carbital 95, and which contains about 0.45 Wt. % of a sodium polyacrylate with a molecular weight less than about 10,000. In experimenting with dry strontium hydroxide severe "nib" formation or lumps resulted leading to conducting all subsequent experiments with a 20% solution or slurry of strontium hydroxide. Table 1 shows bleaching the slurry with 0.05 Wt. % FAS (one pound per ton, or "1#/T"), divided into four aliquots, one with 0.05 Wt. % FAS (FAS only), one substantially stoichiometric amount of strontium hydroxide (0.05 Wt. % strontium hydroxide), one 0.025 Wt. % strontium hydroxide, and one 0.037 Wt. % strontium hydroxide. Whiteness was measured by drying samples of the slurry in a microwave oven followed by milling in a Retsch Pulverisette™ TypeZM 1. The powder was pressed into a tablet and the brightness measured on The Hunter Lab DP™. Sedigraph™ and pH measurements on each (reported in Table 1) were followed by mixing and determining Brookfield viscosities using Brookfield model DV.1 digital viscometer spindle 2 at 20 and 100 rpm at intervals as shown in Table 1.

The results reported in Table 1 show the sample containing 0.05 Wt. % strontium hydroxide has the best stability. The 20 rpm Brookfield viscosity only rose to 595 mpa-s after seven days whereas the control had topped out at 2200 mpa-s after three days. The lower doses of strontium hydroxide reduce the gelation or thickening of the GCC, but less than the theoretical amount. The pH of the slurries ended up slightly higher than normal at 9.7 whereas the "FAS" only sample showed a very low final pH of 8.1.

The results also suggest the strontium hydroxide treated samples have a slightly higher brightness than the sample treated only with FAS.

A second series of tests on batch Carbital 95, reported in Table 2, was carried out using the same procedure as the experiments reported in Table 1 but on stale solutions of strontium hydroxide. Although the second series reported in Table 2 employed the same procedure as the first series of experiments reported in Table 1, the initial results with strontium hydroxide were not as good. The results reported in Table 2 were reruns using a fresh solution of strontium hydroxide since it appeared the strontium hydroxide solution initially employed absorbed and reacted with carbon dioxide in the atmosphere thereby converting part of the strontium hydroxide to strontium carbonate. Using fresh strontium hydroxide produced the same good results as the first sample reported in Table 1.

The results shown in Table 2 follow the same trends as for Sample 1 reported in Table 1. The final pH of the strontium hydroxide-treated sample was 9.5, which was normal for batch Carbital 95. Without the strontium hydroxide addition, the pH of the bleached slurry fell to 9.1.

Table 3 reports similar evaluations with a GCC designated C.90 having 75 Wt. % calcium carbonate solids. Substantially the same results were obtained as in the experiments reported in Tables 1 and 2. In addition, in the examples of Table 3 a sufficient amount of sodium polyacrylate dispersant having a molecular weight less than about 10,000 was used to yield the listed viscosities.

In Tables 1, 2 and 3 the symbol "L" is percent reflectance on the Hunter color chart values whereas "a" and "b" comprise measures of the color tint. The "b" value measures where the tint lies on the blue to yellow scale. Low values are bluish and values above 2 are yellowish.

In Tables 1, 2 and 3, "Psd" refers to "particle size distribution."

TABLE 1

First Carbital 95 Sample Stability Results

| Sample | Sample.1 C-95 Ex Coating Lab 75.7% solids | Sample. 1 1#/T FAS Only | Sample.1 0.05 Wt. % FAS Plus 0.05 Wt. % Sr(OH)$_2$ | Sample.1 0.05 Wt. % FAS Plus 0.025 Wt. % Sr(OH)$_2$ | Sample 1 0.05 Wt. % FAS Plus 0.0375#/T Sr(OH)$_2$ |
|---|---|---|---|---|---|
| Brightness | 95.85 | 96.29 | 97.06 | 96.37 | 96.25 |
| L | 98.01 | 98.36 | 98.36 | 98.25 | 98.20 |
| a | .17 | .16 | .16 | .17 | .15 |
| b | .40 | .35 | −.01 | .36 | .37 |
| Psd | | | | | |
| <10 micron | 99.7 | 99.8 | 100.1 | 99.6 | 100.3 |
| <5 micron | 99.3 | 99.6 | 99.7 | 99.7 | 100.0 |
| <2 micron | 93.9 | 94.6 | 93.9 | 93.6 | 94.0 |
| <1 micron | 67.7 | 68.7 | 67.8 | 67.8 | 67.7 |
| <0.5 micron | 40.7 | 40.9 | 40.6 | 40.9 | 41.2 |
| <0.25 micron | 24.3 | 24.0 | 24.0 | 25.9 | 25.3 |
| Viscosity | As rec'd | | | | |
| @20 rpm | 340 | | | | |
| after mixing | | 140 | 125 | 170 | 210 |
| Stand 1 hr | | 370 | 245 | 330 | 270 |
| Stand 4 hrs | | 670 | 360 | 620 | 375 |
| Overnight | | 1430 | 485 | 1125 | 615 |
| 3 Days | | 2250 | 550 | 1295 | 1235 |
| 7 Days | | na | 595 | 1935 | 1465 |
| @100 rpm | 211 | | | | |
| after mix | | 99 | 92 | 108 | 124 |
| Stand 1 hr | | 218 | 156 | 196 | 168 |
| Stand 4hrs | | 363 | 213 | 344 | 222 |
| Overnight | | 560 | 315 | 514 | 340 |
| Day 3 | | 615 | 356 | 708 | 589 |
| Day 7 | | na | 392 | 728 | 602 |
| PH | As rec'd | | | | |
| After mix | 8.72 | | 9.61 | 8.90 | 9.02 |
| 1 hr | | 8.08 | 9.90 | 9.02 | 9.04 |
| 4 hrs. | | 8.09 | 9.99 | 9.14 | 9.46 |
| overnight | | 8.12 | 9.99 | 8.66 | 9.51 |
| Day 3 | | 8.10 | 9.53 | 8.93 | 9.50 |
| Day 7 | | 8.10 | 9.75 | 8.75 | 9.49 |

TABLE 2

Second Carbital 95 Sample Stability Results

| Sample | Sample 2 C-95 Ex Sylacauga 74.7% solids | Sample 2 0.05 Wt. % FAS Only | Sample 2 0.05 Wt. % FAS Plus 0.05 Wt. % Sr(OH)$_2$ |
|---|---|---|---|
| Brightness | 96.24 | 96.53 | 96.71 |
| L | 98.16 | 98.25 | 98.33 |
| a | .13 | .07 | .13 |
| b | .33 | .26 | .24 |
| Psd | | | |
| <10 micron | 99.5 | 99.6 | 99.9 |
| <5 micron | 99.5 | 99.4 | 99.4 |
| <2 micron | 97.0 | 97.5 | 97.0 |
| <1 micron | 75.8 | 76.5 | 74.6 |
| <0.5 micron | 45.3 | 46.6 | 45.0 |
| <0.25 micron | 27.9 | 29.5 | 27.2 |
| Viscosity | | | |
| @20 rpm | 435 | | |
| after mixing | | na | 110 |
| Stand 1 hr | | 470 | 190 |
| Stand 4 hrs | | 660 | na |
| Overnight | | 1355 | 475 |
| 3 Days | | 1720 | 485 |
| 7 Days | | 1855 | 550 |
| @100 rpm | 232 | | |
| after mix | | na | 81 |
| Stand 1 hr | | 254 | 125 |
| Stand 4 hrs | | 347 | na |
| Overnight | | 565 | 260 |
| Day 3 | | 702 | 330 |
| Day 7 | | 764 | 352 |
| PH | | | |
| After mix | 9.86 | 9.66 | 9.51 |
| 1 hr | | 9.64 | 9.56 |
| 4 hrs. | | 9.44 | na |
| overnight | | 9.19 | 9.51 |
| Day 3 | | 9.13 | 9.51 |
| Day 7 | | 9.10 | 9.50 |

TABLE 3

Example 3 Carbital 90 Sample Stability Results

| TSample | Sample 1 C-90 as rec'd | Sample 1A .5#/T Sr(OH)2 .5#/T FAS | Sample 1B 1#/T Sr(OH)2 1#/T FAS | Sample 1C .5#/T FAS | Sample 1D 1#/T FAS | Sample 2 C-90 as rec'd | Sample 2A 0.5#/T Sr(OH)2 0.5#/T FAS | Sample 2B 1#/T Sr(OH)2 1#/T FAS | Sample 2C 0.5#/T FAS | Sample 2D 1#/T FAS |
|---|---|---|---|---|---|---|---|---|---|---|
| Brightness | 94.05 | 96.95 | 97.14 | 96.94 | 97.10 | 94.29 | 96.65 | 97.05 | 96.87 | 97.06 |
| L | 97.86 | 98.26 | 98.56 | 98.47 | 98.54 | 97.78 | 98.28 | 98.44 | 98.27 | 98.46 |
| a | .48 | .32 | .20 | .22 | .19 | .41 | .24 | .21 | .21 | .22 |
| b | 1.52 | .69 | .24 | .26 | .26 | 1.22 | .19 | .14 | .16 | .15 |
| Mean Psd | .563 | | | | | .555 | | | | |
| <10 micr. | 99.4 | | | | | 99.8 | | | | |
| <5 micr. | 99.3 | | | | | 100.0 | | | | |
| <2 micr. | 95.3 | | | | | 95.6 | | | | |
| <1 micr. | 46.1 | | | | | 73.7 | | | | |
| <0.5 micr. | 25.2 | | | | | 46.2 | | | | |
| <0.25 micr. | | | | | | 29.7 | | | | |
| Viscosity @20 rpms | | | | | | | | | | |
| Day 1 | 265 | 280 | 235 | 330 | 585 | 575 | 530 | 360 | 870 | 1365 |
| Day 3 | 290 | 325 | 340 | 360 | 745 | 735 | 885 | 835 | 1180 | 1985 |
| @100 rpms | | | | | | | | | | |
| Day 1 | 158 | 165 | 139 | 186 | 295 | 292 | 297 | 198 | 420 | 538 |
| Day 3 | 175 | 188 | 195 | 204 | 380 | 375 | 430 | 390 | 512 | 769 |
| PH | | | | | | | | | | |
| Day 1 | 8.82 | 8.77 | 8.86 | 8.67 | 8.50 | 9.0 | 9.42 | 9.74 | 8.94 | 8.83 |
| Day 3 | 8.81 | 8.75 | 8.88 | 8.56 | 8.49 | 8.97 | 9.74 | 9.60 | 8.78 | 8.67 |

The process of the invention also takes into account the various components comprising the calcium carbonate slurry, reductive bleaching agent, and metal material. Accordingly, the invention also relates to a product produced by the process of the invention.

The various numerical ranges describing the invention as set forth throughout the specification also include any combination of the lower ends of the ranges with higher ends of the ranges set forth herein, or any single experimental value or other single value set forth herein that will extend or reduce the scope of the lower limits of the range or the higher limits of the range, where the range includes inter alia, ranges of concentrations of compounds, ratios of these compounds to one another, ranges of particle size, and particle size distribution, and the like, as well as all whole number, and/or fractional number values encompassed by these ranges, and ranges encompassed within these ranges. The term "about" as it applies to individual numerical values, or numerical values stated in the ranges of the present specification means slight variations in these values. Any references to a United States patent, and other printed publication set forth in the written description is incorporated in the written description by reference. All quantities of materials expressed in percentages are percentages by weight unless otherwise indicated. Reductive bleaching agents, in addition to the description of these compounds previously given, also, in one embodiment, include sulfur-type reductive bleaching agents, such as compounds containing both sulfur and oxygen that function as reductive bleaching agents, and their equivalents. "Reductive bleaching," as used herein refers to bleaching with reductive bleaching agents, as defined herein.

The principles, various embodiments, and modes of operation of the present invention have been described in the foregoing written description. The invention which is intended to be protected here, however, is to be construed as including variations, and changes that may be made by those skilled in the art without departing from the spirit of the invention.

What is claimed is:

1. A process for bleaching comprising:
   (1) providing a particulate calcium carbonate aqueous slurry with a reductive bleaching agent that causes reductive bleaching of said particulate calcium carbonate aqueous slurry; and
   (2) prior to or subsequent to said reductive bleaching, combining said particulate calcium carbonate aqueous slurry with a metal material to obtain a bleached particulate calcium carbonate aqueous slurry, wherein said metal material is selected to reduce any increase in viscosity of said bleached particulate calcium carbonate aqueous slurry.

2. The process of claim 1, wherein said metal material is selected to react with anions produced by said reductive bleaching and produce a metal material reaction product.

3. The process of claim 2, wherein said metal material is selected to form a substantially water insoluble metal material reaction product.

4. The process of claim 3, wherein said metal material is a strontium material.

5. The process of claim 2, wherein said particulate calcium carbonate aqueous slurry comprises an aqueous ground calcium carbonate slurry.

6. The process of claim 1, wherein said particulate calcium carbonate aqueous sluny has a solids content of from about 60% by weight to about 80% by weight.

7. The process of claim 1, wherein said metal material is combined with said particulate calcium carbonate aqueous slurry subsequent to said reductive bleaching.

8. The process of claim 6, wherein said metal material is combined with said particulate calcium carbonate aqueous slurry subsequent to said reductive bleaching.

9. The process of claim 1, wherein said reductive bleaching agent is formamidine sulfinic acid (FAS), and said metal material is selected from the group consisting of strontium oxide, strontium peroxide, and strontium hydroxide, and combinations thereof.

10. The process of claim 6, wherein said reductive bleaching agent is FAS, and said metal material is selected from the group consisting of strontium oxide, strontium peroxide, and strontium hydroxide, and combinations thereof.

11. The process of claim 7, wherein said reductive bleaching agent is FAS, and said metal material is selected from the group consisting of strontium oxide, strontium peroxide, and strontium hydroxide, and combinations thereof.

12. The process of claim 8, wherein said reductive bleaching agent is FAS, and said metal material is selected from the group consisting of strontium oxide, strontium peroxide, and strontium hydroxide, and combinations thereof.

13. A composition comprising a particulate calcium carbonate aqueous slurry combined with:
   (1) a reductive bleaching agent to provide reductive bleaching of said particulate calcium carbonate aqueous slurry; and
   (2) a metal material,
   wherein said metal material is selected to reduce any increase in viscosity of said particulate calcium carbonate aqueous slurry combined with said bleaching agent.

14. The composition of claim 13, wherein said metal material is selected to react with anions produced by said reductive bleaching and produce a metal material reaction product.

15. The composition of claim 14, wherein said metal material is selected to form a substantially water insoluble metal material reaction product.

16. The composition of claim 15, wherein said metal material is a strontium material.

17. The composition of claim 14, wherein said particulate calcium carbonate aqueous slurry comprises an aqueous ground calcium carbonate slurry.

18. The composition of claim 13, wherein said particulate calcium carbonate aqueous slurry has a solids content of from about 60% by weight to about 80% by weight.

19. The composition of claim 13, wherein said metal material is combined with said particulate calcium carbonate aqueous slurry subsequent to said reductive bleaching, so that said composition has reduced viscosity.

20. The composition of claim 18, wherein said metal material is combined with said particulate calcium carbonate aqueous slurry subsequent to said reductive bleaching, so that said composition has reduced viscosity.

21. The composition of claim 13, wherein said reductive bleaching agent is FAS, and said metal material is selected from the group consisting of strontium oxide, strontium peroxide, and strontium hydroxide, and combinations thereof.

22. The composition of claim 18, wherein said reductive bleaching agent is FAS, and said metal material is selected from the group consisting of strontium oxide, strontium peroxide, and strontium hydroxide, and combinations thereof.

23. The composition of claim 19, wherein said reductive bleaching agent is FAS, and said metal material is selected from the group consisting of strontium oxide, strontium peroxide, and strontium hydroxide, and combinations thereof.

24. The composition of claim 20, wherein said reductive bleaching agent is FAS, and said metal material is selected from the group consisting of strontium oxide, strontium peroxide, and strontium hydroxide, and combinations thereof.

* * * * *

UNITED STATES PATENT AND TRADEMARK OFFICE
CERTIFICATE OF CORRECTION

| | | |
|---|---|---|
| PATENT NO. | : 7,105,139 B2 | Page 1 of 1 |
| APPLICATION NO. | : 10/254553 | |
| DATED | : September 12, 2006 | |
| INVENTOR(S) | : Christopher R.L. Golley et al. | |

It is certified that error appears in the above-identified patent and that said Letters Patent is hereby corrected as shown below:

On the Title page, Section (74) in the Attorney, Agent or Firm, line 1 "Handerson," should read --Henderson,--.

In Claim 6, column 10, line 60, "sluny" should read --slurry--.

Signed and Sealed this

Twenty-second Day of May, 2007

JON W. DUDAS
*Director of the United States Patent and Trademark Office*